Figure 3:
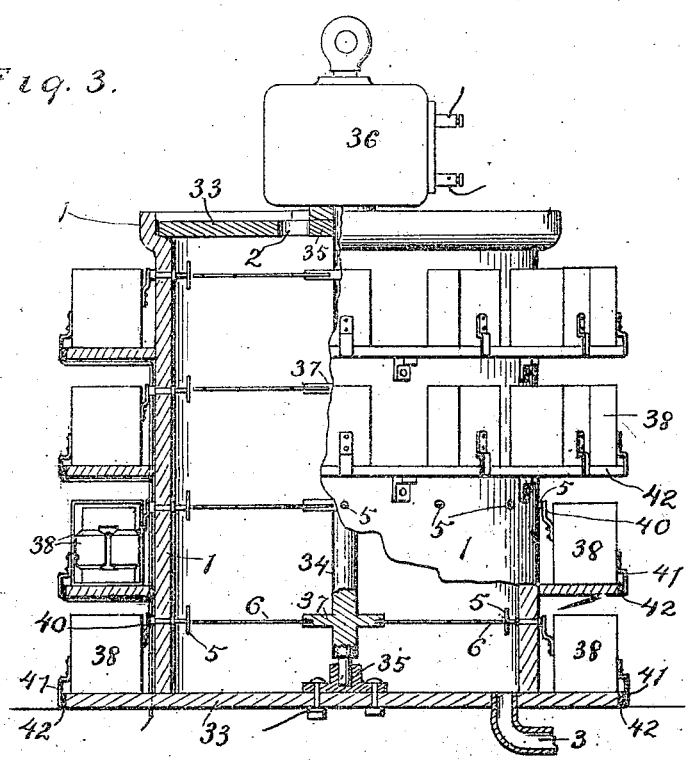

No. 709,867. Patented Sept. 30, 1902.
C. S. BRADLEY & D. R. LOVEJOY.
PROCESS OF MANUFACTURING NITROGEN COMPOUNDS FROM ATMOSPHERIC NITROGEN.
(Application filed Mar. 9, 1900.)
(No Model.) 3 Sheets—Sheet 1.

UNITED STATES PATENT OFFICE.

CHARLES S. BRADLEY AND DIMMITT ROSS LOVEJOY, OF NEW YORK, N. Y., ASSIGNORS, BY MESNE ASSIGNMENTS, TO ATMOSPHERIC PRODUCTS COMPANY, OF NIAGARA FALLS, NEW YORK, A CORPORATION OF NEW YORK.

PROCESS OF MANUFACTURING NITROGEN COMPOUNDS FROM ATMOSPHERIC NITROGEN.

SPECIFICATION forming part of Letters Patent No. 709,867, dated September 30, 1902.

Application filed March 9, 1900. Serial No. 3,008. (No specimens.)

*To all whom it may concern:*

Be it known that we, CHARLES S. BRADLEY and DIMMITT ROSS LOVEJOY, citizens of the United States, residing at New York, in the county and State of New York, have invented certain new and useful Improvements in Processes for the Manufacture of Nitrogen Compounds from Atmospheric Nitrogen, of which the following is a specification.

This invention relates to a process for the manufacture of nitrogen compounds from atmospheric nitrogen; and its object is to decrease the expenditure of energy and material in the production of such compounds.

The present process is based on the combination of nitrogen and oxygen by means of the electric current passing through a mixture of such gases. We have found that the amount of nitrogen compound produced is dependent to a large extent on the relation between the amount of electric energy applied and the amount of gaseous mixture exposed to the action of such energy, and our invention is directed in part to the proportioning of the quantities of electric energy and of air or mixed gases to give such maximum efficiency.

Another important feature of our process relates to the maintenance of the electric current when it is passing through the mixed gases in the form adapted to give the highest yield of nitrous product for a given expenditure of energy. It is known that the silent discharge is not capable of producing nitrification to any substantial extent. We have found that the ordinary disruptive discharge or spark is also of comparatively little capacity in this respect and that for a large and substantial yield of nitrous product the use of an arc is imperative; but we have also found that the efficiency of an arc in the production of nitrous product is dependent on its form or quality and that the most efficient arc is that which has a minimum volume of current compatible with its existence as a true arc—that is to say, the thinner the arc the greater the efficiency up to the point where the arc gets so thin that it breaks or cannot be maintained. The high efficiency of such an arc is probably due to the comparatively large surface exposed to the air compared to the amount of energy involved, thereby insuring the maximum synthetic effect and the minimum of disassociating effect. A thin arc of this nature, however, necessarily represents a quite limited amount of current—say about one to ten thousandths of an ampere—and in order to obtain a reasonably large production from a single energizing source it is therefore necessary to subdivide the current from such source. In such subdivision of the current it is necessary on account of the high voltage to arrange the arc circuits in parallel, and when this is done the difficulty is encountered that as soon as one arc starts it tends to act as a short circuit for all the other arc-circuits and prevents the starting of any other arc. To overcome this, we provide transformers or inductances so arranged that the sudden diversion of energy to any one circuit is prevented, and we also provide means whereby each individual arc is interrupted shortly after it starts—that is, the arcs are intermittently interrupted—so that opportunities for each arc-circuit to take current are being presented continually or in rapid succession. Inasmuch as the current will generally be supplied from a source of approximately constant potential, or at least a source which will deliver increased current in response to decrease of resistance, it is apparent that the moment any arc has started it will tend to grow in volume. Thus assuming that sufficient voltage is supplied to jump the space between the terminals and form a thin arc the resistance of the air will on starting of the arc immediately decrease and the volume of the arc will immediately tend to increase. As above pointed out, it is desirable to maintain the arc at the minimum thickness or volume. To this end we arrange to cause each arc as soon as formed to be drawn out or elongated, so as to maintain the resistance and produce an arc of minimum thickness, which elongates to a certain extent and then breaks, the rapid repetition of this process producing the intermittence of the arcs above referred to.

Our invention also comprises certain improvements in the methods of collecting the nitrous products, the object of such improvements being to obviate the expense of alkalies or similar materials for collection of the nitrous product.

Figure 4:
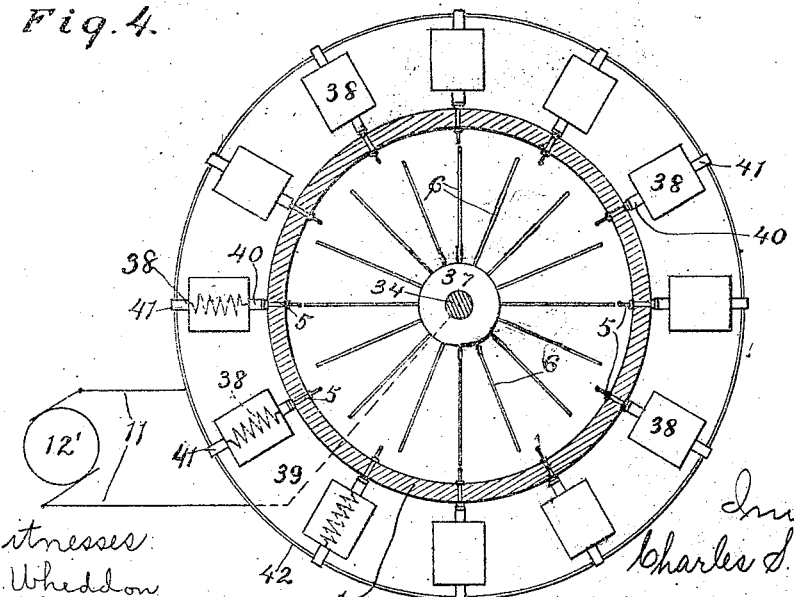
Figure 5:
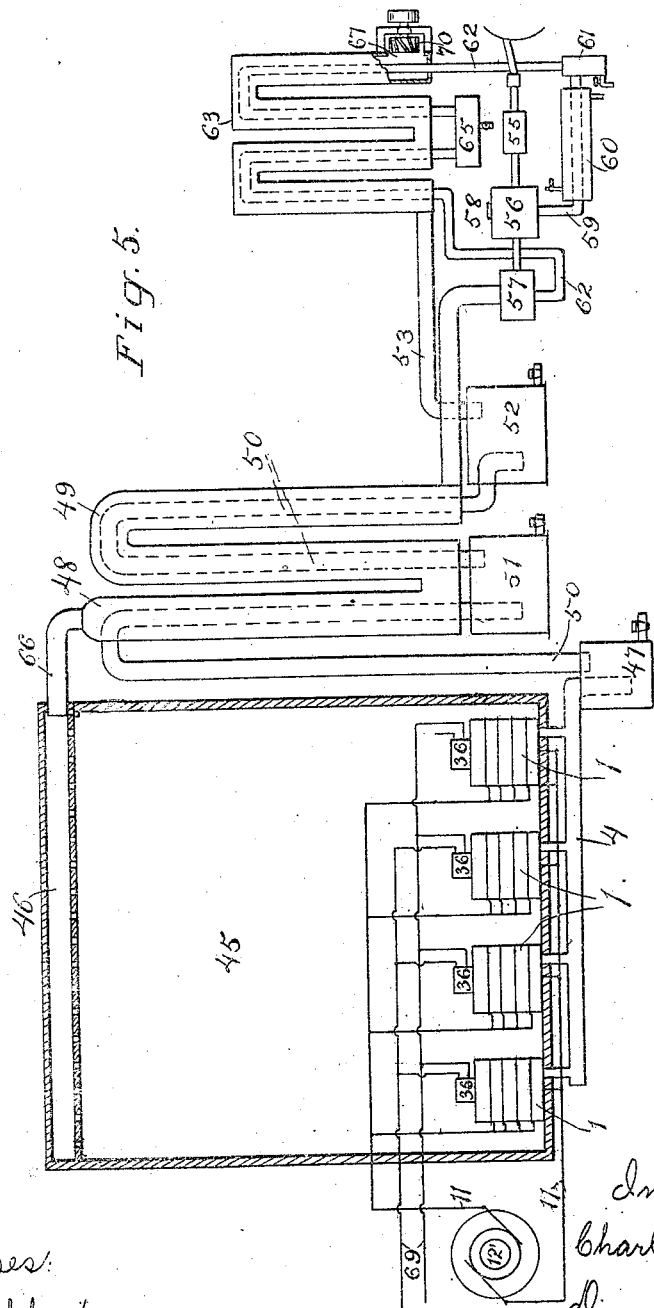

In the accompanying drawings, Figure 1 is a diagrammatic representation of the apparatus employed for carrying out our invention, such apparatus being particularly adapted to alternating currents. Fig. 2 shows in detail a single unit of the installation illustrated in Fig. 1. Figs. 3 and 4 show a modification of the apparatus adapted for direct current. Fig. 5 shows the complete installation of devices constructed according to Figs. 3 and 4.

Referring to Fig. 1, a plurality of receivers are shown at 1, these receivers being of glass or other suitable material. Inlet and outlet ducts or passages 2 3, respectively, at the bottom and at one side of the respective receivers provide for the passage of air through the same, the passages 2 leading to the outer air or to a source of air and the passages 3 being connected to delivery-pipes 4, leading to the collecting apparatus. Two terminals 5 6 are sealed through and into each receiver, so as to be in proximity at some point (indicated at 7) and diverging from this point in any desired direction. In this case the divergence is upwardly, with the result that when an arc is struck between the two terminals it will travel upwardly under the influence of the draft caused by its own heat or by reason of the air-current delivered through the air-receptacle or for any other reason, and will thereby become rapidly elongated or drawn out, thus preventing the sudden decrease of resistance and increase of current that would otherwise take place, and finally the arc will snap or break at the ends of the terminals before the arc deteriorates into a spark, this operation taking place repeatedly, it being understood that the voltage delivered to the terminals is just sufficient to insure its breaking across the narrowest part of the air-gap between the terminals. It is important to break the arcs in such manner as to prevent formation of sparks, as the main effect of the latter is to produce ozone, while for nitrification arcs are more efficient. The several arc-supplying circuits 8 8 are supplied from the secondary coils 9 of transformers whose primaries 10 are connected in parallel to the energizing-circuit 11, which may be energized from any suitable source, such as the alternating-current generator 12. The repeated interruption of the arcs at short intervals by the automatic operation of the devices above described tends to enable the distribution of the energy between the several receivers or nitrifying devices; but in order to insure such uniform distribution the separation of the individual arc-circuits, as by their connection to separate transformer-circuits, is essential, as otherwise there would be a tendency to concentration of all the electric energy in one or a few of the arcs.

For collecting the nitrous products of the air passing from the receivers aforesaid we may use any suitable means; but in order to avoid the use of absorbing media, such as alkaline solutions, and to obtain the product in the most concentrated and valuable form we prefer to operate by absorption in sulfuric acid and subsequent removal from the absorbing acid by heating or to operate by direct condensation of nitrous products into a liquid form by exposure of the air containing such products to a suitable degree of cold. In either case the nitrous products are delivered as such—i. e., as anhydrous oxids of nitrogen. In collecting the products by the use of sulfuric acid the apparatus represented in Fig. 1 may be used, the same comprising a tubular conduit or tower 14, through which the gases from the nitrifying apparatus are drawn in an upward direction, while sulfuric acid is supplied at the top of the tubular conduit and trickles over the obstructing material 15 placed therein, absorbing in its downward passage substantially all of the nitrous product contained in the air, and finally passing into a receptacle 16, which is kept warm by suitable heating means 17, so as to heat the sulfuric acid sufficiently to cause expulsion of the nitrous product as vapor, such vapor passing off through worm 18 in cooler 19 to the receptacle 20. A pump 21 draws the sulfuric acid through a return-tube 22, passing through a cooler 23. Blower 24 draws the air upwardly in the tubular conduit, and thus draws the nitrified air through pipes 4 from all the nitrifying devices or receivers 1, a steady current of air thus being maintained through such receivers.

The preferred construction of the individual nitrifying devices is shown in Fig. 2, wherein 25 represents a jar containing the transformer 9 10, embedded in insulating-cement 26 and with its secondary terminals 27 adapted to receive the terminals 28 of the nitrifying device, the construction of the latter being as above described. The outlet 3 of the receiver 1 of such nitrifying device is preferably in the form of a nozzle, as shown, so as to be slipped into the mouth 29 of a delivery-pipe 4. The primary terminals 30 of the transformer are adapted to contact with contact-strips 32 on the shelf 31, on which the device is placed, so that the act of putting the transformer in place closes the electric connections thereof and puts it in connection with the delivery-pipe 4.

The electrical system of distribution or subdivision above described is especially applicable in connection with alternating current. In view of the expense involved in the construction of the great number of small transformers required in such a system we prefer to operate with the apparatus shown in Figs. 3, 4, and 5, which is adapted to produce intermittent interruption of the arcs at such a high rate or frequency as to enable the differentiation or electric separation of the individual arc-circuits to be effected by the mere interposition in each such circuit of an inductance of slight capacity and correspondingly slight cost, such a system being applicable either in conjunction with a high-tension direct current or with an alternating current of ordinary frequency.

Referring now to Figs. 3 and 4, the receiver 1 in this case is common to a large number of arc-developing devices or terminals 5 6. Said receiver consists of a cylinder, preferably of refractory insulating material, closed at top and bottom by plates or ends 33 of similar material, in which are found the inlet and outlet apertures 2 3. The terminals 5 are set into the cylindrical wall of receptacle 1 and project slightly into said receptacle. On a spindle 34, mounted in bearings 35 and driven by motor 36, are carried a plurality of movable terminals 6, preferably arranged radially on disks 37 on said spindle, each disk carrying a series of terminals adapted to coöperate with all of the fixed terminals 5 adjacent to their plane of rotation. The terminals 5 are connected, through branch circuits containing inductances or induction-coils 38, to one side of a circuit 11, containing a generator 12', in this case a high-tension direct-current generator, whose other side is connected to the step of the spindle 34. As the spindle is rotated by the motor the arcs are struck, drawn, and interrupted in rapid succession between the fixed and moving terminals, each moving terminal coming close enough to the fixed terminals in the same series to enable the arc to strike across and then by withdrawing quickly drawing the arc rapidly out. By providing a sufficient number of the movable terminals 6 and rotating the shaft at a sufficient speed a periodicity of interruption of the arcs may be obtained of, say, five hundred to one thousand per second. With such periodicity it is obvious that the inductance required in the several branch circuits in order to effect sufficient electrical separation of the circuits, including the discharge devices to prevent the short-circuiting effect above referred to, is extremely small, and the cost of the inductance devices will be proportionately light. In fact, the induction devices may be of such small inductive effect that an alternating current of ordinary frequency may traverse same without any substantial loss, and the energizing circuit 11 may therefore be a high-tension low-frequency alternating current supplied either direct or by step-up transformers from a suitable alternator. In order to facilitate removal, inspection, and repair of the inductance devices, we may arrange them on shelves 39 around the casing of receiver 1 and provide on the body or case of each inductance device terminals 40 41, adapted to contact, respectively, with the outer ends of the terminals 5 in the receptacle 1 and with contractions 42 on the said shelves, said contact-rings being connected to the circuit-wire 11, as shown, so that the act of putting the inductance device in place completes its circuit. This construction does away with the elaborate wiring that would otherwise be required.

In Fig. 5 is shown a complete installation comprising devices of the type represented in Figs. 3 and 4, inclosed in a room or chamber 45, supplied with fresh air at the top by means of conduit or distributing-chamber 46 and the air being drawn out at the bottom of the receivers 1 by conduit or main 4, which may include a trap 47 for arresting, collecting, and delivering any nitric acid that may be formed. The collecting means for the nitrous product here shown is based on the condensing principle and comprises, preferably, two coolers 48 49, through which the pipe 50 from the main 4 or from the trap 47 passes successively. In the first of these coolers the air is cooled sufficiently—say to about 0° centigrade—to condense substantially all of the nitrogen tetroxid ($N_2O_4$) which collects in a receiver 51, and the remaining gas then passing through the cooler 49 is further cooled sufficiently (to 30° centigrade or below) to condense all the nitrogen trioxid ($N_2O_3$) which is collected in a receiver 52. From the receiver 52 the unaltered air is discharged through pipe 53. Inasmuch as this discharged air is extremely cold, we prefer to pass it through regenerating devices to utilize such cold. We also prefer to subject the air which is to undergo the nitrification process to a preliminary cooling, so as to deposit all the moisture therefrom, and the apparatus shown is adapted to carry out these several functions. 55 represents an engine, 56 a compressor, and 57 an expansion-engine cylinder, all these devices being mechanically connected to mutually interchange power. The air is taken in from the atmosphere at 58, compressed in cylinder 56, then passes through a pipe 59, cooled by water-cooler 60, and the moisture is collected and removed in trap 61. The air then passes by pipe 62 through cooler 63, where more moisture is trapped out at 65, and then through the expansion-engine 57, which further cools it. Finally, the cold dry air passes to the coolers 49 48, successively, serving as the refrigerating medium for the air coming from the nitrifying-chambers. The air passes from the cooler through pipe 66 to conduit 46, which delivers it to the nitrifying devices. This air being extremely dry, the formation of nitric acid is reduced to a minimum, which is of advantage when the nitrous oxid and nitrogen tetroxid are to be collected as such. The further advantage is presented that corrosion of the metallic parts of the nitrifying apparatus is reduced to a minimum, and by forming such parts—for example, the terminals 5 6—of iron they are rendered substantially permanent. From the nitrifying-chamber the gas passes as above described back through the coolers 48 49, depositing successively its nitrogen tetroxid, and its nitrous oxid in the respective receivers 51 52, finally passing from the latter receiver through cooling devices 62 in cooling relation to pipe 62 and escapes into the air at outlet 67, a blower 70 being located, if desired, at any suitable point to promote such circulation of the air. The electric connections are as shown, all the arcing-circuits being connected in multiple to the exciting-circuit 11 and the several motors 36 being connected to an energizing-circuit 69.

In the operation of the above-described apparatus the ratio of air flow to the amount of energy supplied by the electric discharges or arcs is such as to carry away the combination products of the discharge almost as rapidly as they are formed. The amount of nitrous product only amounts to about two to three per cent. of the amount of air supplied. By this means we substantially prevent the waste due to dissociation by the action of the arcs on the combination products already formed.

Having now described our invention, what we claim as new therein, and desire to secure by Letters Patent, is—

1. The process of producing compounds of nitrogen and oxygen, consisting in exposing to the action of an electric arc, a mixture of nitrogen and oxygen and forcing the said mixture through the space containing the arc of minimum volume in sufficient volume, and with sufficient rapidity of renewal, to carry away the nitrous products from the arc and substantially prevent disassociation.

2. The process of producing compounds of nitrogen and oxygen, consisting in establishing in a mixture of nitrogen and oxygen, an electric current in the form of an arc of minimum volume, and maintaining such arc at the minimum volume sufficient to prevent its breaking.

3. The process of producing compounds of nitrogen and oxygen, consisting in establishing in a mixture of nitrogen and oxygen an electric current in the form of an arc of minimum volume, and repeatedly interrupting and reëstablishing such arc.

4. The process of producing compounds of nitrogen and oxygen consisting in repeatedly establishing in a mixture of nitrogen and oxygen, an electric current in the form of an arc of minimum volume, elongating said arc and interrupting same.

5. The process of producing compounds of nitrogen and oxygen, consisting in removing from atmospheric air substantially all moisture contained therein, then exposing the dried air to the action of the electric arc, separating the resulting nitrous products as anhydrous oxids of nitrogen from the unaltered air, and discharging such unaltered air.

6. The process of producing compounds of nitrogen and oxygen, consisting in removing the moisture from air by cooling, subjecting the dried air to the action of the electric arc, cooling the air to remove by condensation the nitrous products, and separating such condensed products.

7. The process of producing compounds of nitrogen and oxygen, consisting in exposing a mixture of the gases to the action of an interrupted current in an electric circuit, and setting up in such circuit by the inductive effect of such interrupted current, induced counter electromotive forces resisting rapid increase of current.

8. The process of producing compounds of nitrogen and oxygen, consisting in establishing in a mixture of nitrogen and oxygen, an electric current in the form of an arc of minimum volume, elongating such arc with sufficient rapidity to prevent any substantial increase of quantity of current passing, and, by such elongation, breaking such arc before it passes into a spark.

9. The process of producing compounds of nitrogen and oxygen, consisting in exposing air to the action of the electric arc, then cooling the mixed gases sufficiently to condense the resulting nitrogen tetroxid, separating and collecting such nitrogen tetroxid, then further cooling the remaining gases to condense the nitrogen trioxid and separating and collecting the said nitrogen trioxid.

CHARLES S. BRADLEY.
D. ROSS LOVEJOY.

Witnesses:
J. GREEN,
A. P. KNIGHT

---

It is hereby certified that in Letters Patent No. 709,867, granted September 30, 1902, upon the application of Charles S. Bradley and Dimmitt Ross Lovejoy, of New York, N. Y., for an improvement in "Processes of Manufacturing Nitrogen Compounds from Atmospheric Nitrogen," an error appears in the printed specification requiring correction as follows: On page 4, line 30, the words "of minimum volume" should be stricken out and inserted after the word "arc," line 27, same page; and that the said Letters Patent should be read with this correction therein that the same may conform to the record of the case in the Patent Office.

Signed and sealed this 21st day of October, A. D., 1902.

[SEAL.]

F. I. ALLEN,
*Commissioner of Patents.*

It is hereby certified that in Letters Patent No. 709,867, granted September 30, 1902, upon the application of Charles S. Bradley and Dimmitt Ross Lovejoy, of New York, N. Y., for an improvement in "Processes of Manufacturing Nitrogen Compounds from Atmospheric Nitrogen," an error appears in the printed specification requiring correction, as follows: On page 4, line 30, the words "of minimum volume" should be stricken out and inserted after the word "arc," line 27, same page; and that the said Letters Patent should be read with this correction therein that the same may conform to the record of the case in the Patent Office.

Signed and sealed this 21st day of October, A. D., 1902.

[SEAL.]

F. I. ALLEN,
*Commissioner of Patents.*